United States Patent
Nayman

[11] Patent Number: 6,092,787
[45] Date of Patent: Jul. 25, 2000

[54] SAFE OPERATING MOTORCYCLE LIFT AND METHOD

[76] Inventor: Alvin A. Nayman, 5320 Bragg Rd., Cleveland, Ohio 44127

[21] Appl. No.: 09/311,384

[22] Filed: May 13, 1999

[51] Int. Cl.$^7$ ....................................................... B60P 1/16
[52] U.S. Cl. ............................................................. 254/10 R
[58] Field of Search ...................................... 254/8 R, 8 B, 254/8 C, 9 R, 9 B, 9 C, 10 R, 10 B, 10 C, 89 R, 894, 90, 124, 122, 131

[56] References Cited

U.S. PATENT DOCUMENTS

| | | | |
|---|---|---|---|
| 3,863,890 | 2/1975 | Ruffing | 254/10 C |
| 4,088,303 | 5/1978 | Aquila | 254/88 |
| 4,251,056 | 2/1981 | Maniglia | 254/8 R |
| 4,324,384 | 4/1982 | Elser | 254/131 |
| 4,460,158 | 7/1984 | Chiesa . | |
| 4,681,299 | 7/1987 | Siebert . | |
| 4,723,756 | 2/1988 | Stumpf, Jr. . | |
| 4,886,243 | 12/1989 | Trumbull | 254/88 |
| 4,899,985 | 2/1990 | Good . | |
| 5,067,739 | 11/1991 | Kuan . | |
| 5,096,159 | 3/1992 | Fletcher | 254/90 |
| 5,211,376 | 5/1993 | Anderson . | |
| 5,271,603 | 12/1993 | White . | |
| 5,518,224 | 5/1996 | Anderson . | |
| 5,690,314 | 11/1997 | Williams | 254/88 |

*Primary Examiner*—Robert C. Watson
*Attorney, Agent, or Firm*—Joseph H. Taddeo

[57] ABSTRACT

An improved, safe operating, motorcycle lift having protective mechanisms to prevent the accidental release that may cause damage or injury when operating the apparatus. The present invention lifts the motorcycle through the tires of the bike, thereby preventing damage to the undercarriage or exhaust systems. The lift has a novel configuration comprised of two trestle type legs, having four telescoping extendible rods with cylindrical feet at one end. The manually operated hydraulic lift uses a connecting rod to operate synchronously the legs in unison. The legs and connecting rod comprise a novel open-based parallelogram being manually operated by a hydraulic jack. A newly designed latching mechanism prevents the accidental release, which can lower the lift. Protective curtains define the area beneath the lift by being placed around the perimeter of the work area. The 2-wheel vehicle can be clamped by either it's front wheel or by it's rear wheel. A removable tail extension allows easy access to the unsupported wheel. The lift accommodates either type of center stand or side kickstand. When not in use, the lift lowers to less than 7 inches, which allows for storage of the lift stand under ones automobile. Alternatively, the lift can be stored in a vertical position, with the top being secured to a wall to prevent it from toppling over and falling, causing damage or injury.

16 Claims, 9 Drawing Sheets

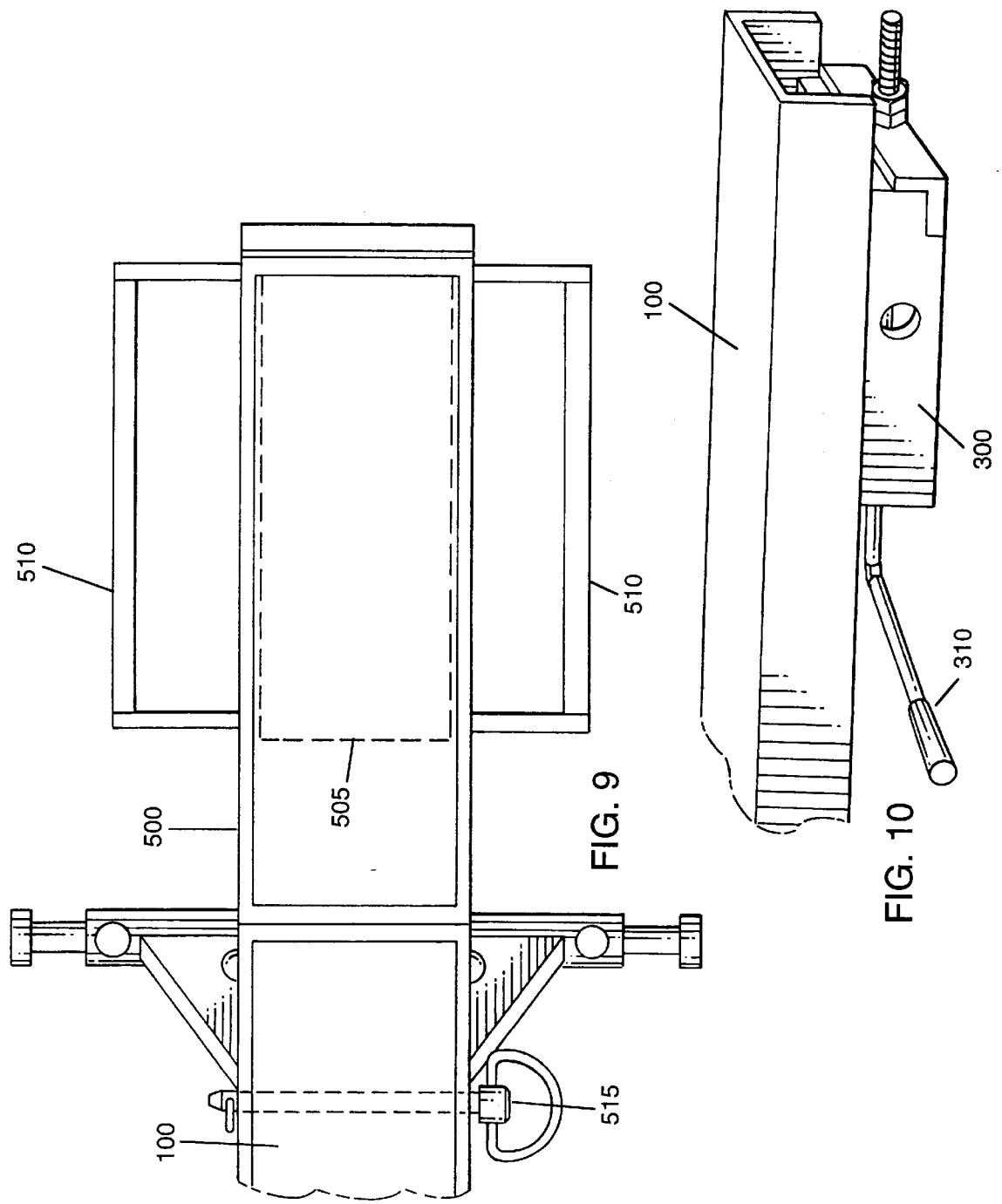

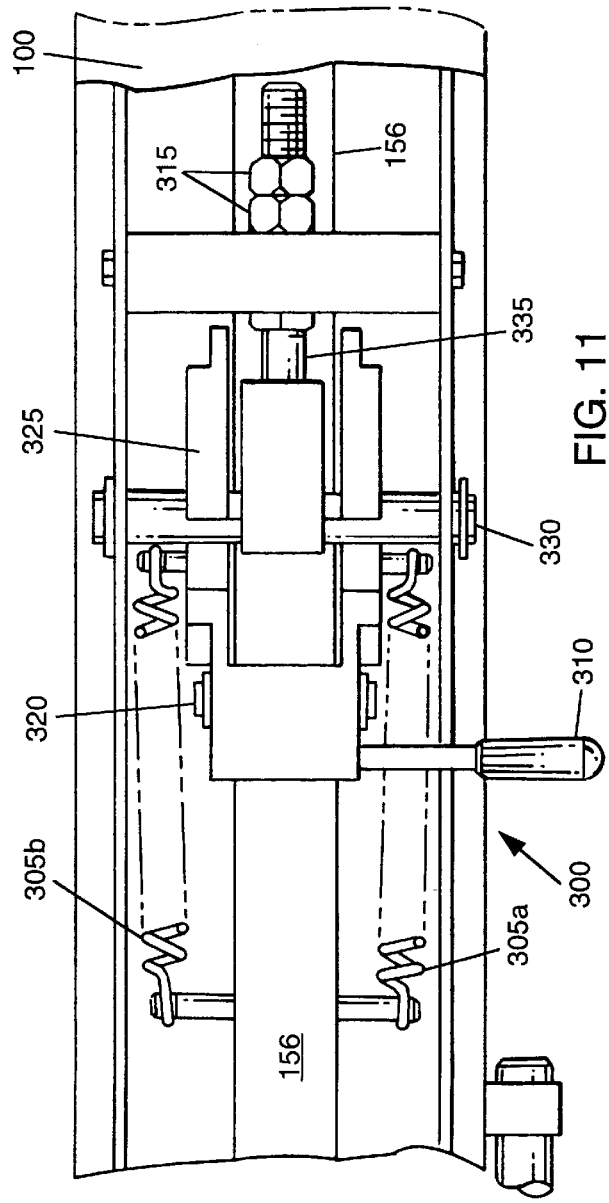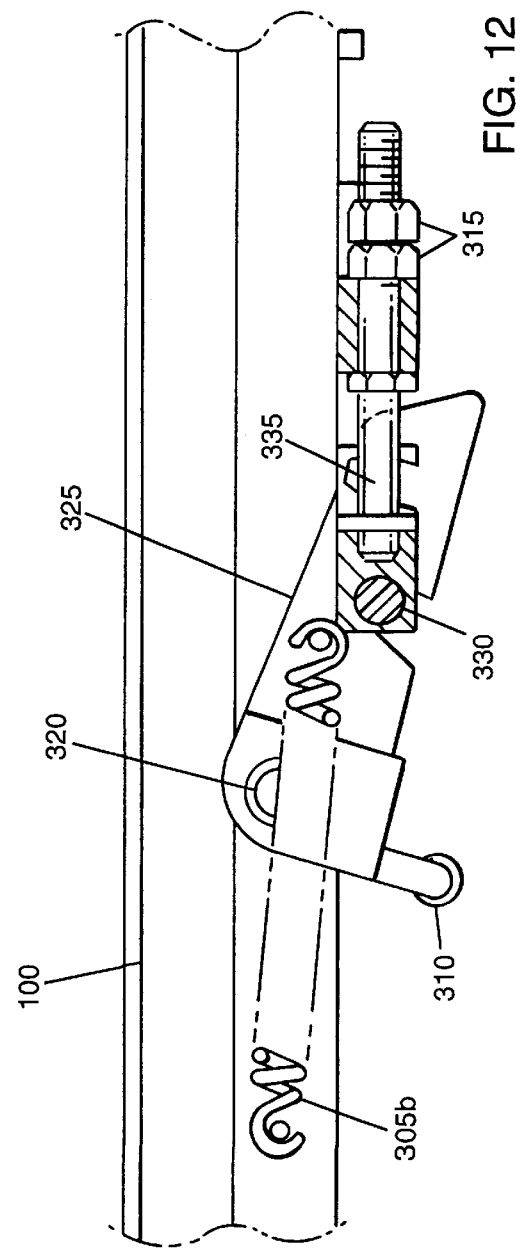

SAFE OPERATING MOTORCYCLE LIFT AND METHOD

FIELD OF THE INVENTION

The present invention relates primarily to an improved safe operating motorcycle lift, and more particularly, to an improved motorcycle lift having protective mechanisms to prevent the accidental release that may cause damage or injury when operating the apparatus.

BACKGROUND OF THE INVENTION

Previously, the prior art disclosed motorcycle jack apparatus that were awkward and cumbersome to use. Some showed lacking in safety features that could prevent injury or damage when using the mechanism or even when the bike jack is being stored and not in use.

The following prior art discloses motorcycle lifts, jacks and stands that are used for the convenience of repairing or maintaining one's riding conveyance.

U.S. Pat. No. 5,518,224, granted May 21, 1996, to K. C. Anderson, discloses a foot operated motorcycle lift stand, where the cyclist manually steadies the motorcycle, while actuating a foot lever to shift the stand platform in a position with the undercarriage, to lift the motorcycle. When not in use, the lift stand can be conveniently stored in an upright position, where the edges of the platform and base provide a stable resting means.

U.S. Pat. No. 5,271,603, granted Dec. 21, 1993, M. White, discloses a vehicle lift having a base and lifting platform that is connected to the base by pivotally connected legs. A motorcycle is intended to be positioned over the platform when in its low profile state and is raised by the platform to its elevated protracted state upon activation of the hydraulic jack and is raised by the platform to its elevated protracted state upon activation of the hydraulic jack component.

U.S. Pat. No. 5,211,376, granted May 18, 1993, to D. J. Anderson, discloses a motorcycle jack assembly comprising a wheel support frame having tire alignment members and tie down means fixing one wheel of the motorcycle in the wheel support frame.

U.S. Pat. No. 4,899,985, granted Feb. 13, 1990, to D. Good, discloses a castered, low-profile hydraulic lift assembly having a pivoted lift arm that supports a plurality of detachable transitional lift arms and lift heads.

U.S. Pat. No. 4,723,756, granted Feb. 9, 1988, to C. W. Stumpf, Jr., teaches of a portable stand and lift, which can lift a motorcycle unassisted. After hoisting to the desired height, pins are inserted as a locking means to immobilize the movable frame members.

U.S. Pat. No. 4,681,299, granted Jul. 21, 1987, to L. P. Siebert, discloses a motorcycle jack having front and rear cross shafts rotatably supported. The front and rear shafts are interconnected with a linkage mechanism so that they rotate in unison, but in opposite directions.

U.S. Pat. No. 4,460,158, granted Jul. 17, 1984, to Matteo Chiesa, et al., teaches of a lift for raising mopeds and motorcycles, having a base, to which is attached a hinged jack, and having a frame with a motorcycle support adaptable to the footboard of a Vespa.

The prior art recited above does not teach of the novel advantages that are found in the present invention.

However there is a particular need for a safe operating, reliable, portable 2-wheeled tandem automotive vehicle lift, one that can be stored in either a vertical or a horizontal position. There is a special need for a motorcycle lift that performs the lift action through the tires of the bike, so as not to damage the undercarriage by coming in contact with it. Additionally, the lift must have incorporated within the design, safety features that will prevent the lift apparatus from tipping or falling over, features that will automatically lock the lift, when in its raised position to prevent it from lowering unexpectedly. This type of lift can enable a motorcycle enthusiast to perform his own maintenance procedure, such as, changing the engine oil, performing an engine tune-up or rotating or replacing the tires.

Accordingly, it is therefore an object of the present invention to provide a motorcycle lift having newly designed mechanisms for the safe operation of the lift apparatus.

It is another object of the present invention to provide a safe operating motorcycle lift having a base with telescoping extendible projections to stabilize the apparatus from tipping or falling over.

It is still another object of the present invention to provide a safe operating motorcycle lift that has a protective curtain that delineates and defines the perimeter of the operational area beneath the lift.

It is still yet another object of the present invention to provide a safe operating motorcycle lift having a novel automatic locking mechanism that automatically engages when the lift is raised, thereby preventing the accidental or inadvertent release, which may lower the lift stand.

It is still a further object of the present invention to provide a safe operating motorcycle lift having an adjustable center stand support with an adjustable side kickstand support that projects from the center kickstand.

It is still yet a further object of the present invention to provide a safe operating motorcycle lift having a locking front wheel clamp to secure and stabilize the 2-wheeled vehicle in an upright position.

An additional object of the present invention is to provide a safe operating motorcycle lift having a removable tail extension with a retractable tail ramp to enable the loading or unloading of the bike.

A final object of the present invention is to provide a safe operating motorcycle lift that can be stored, when not in use, either under an automobile, or by standing it up, in a vertical position.

These as well as other objects and advantages of the present invention will be better understood and appreciated upon reading the following detailed description of the preferred embodiment when taken in conjunction with the accompanying drawings.

SUMMARY OF THE INVENTION

The present invention relates primarily to a novel motorcycle lift having newly designed mechanisms for the safe operation of the lift apparatus. The lift is designed with a base having telescoping extendible projections to stabilize the apparatus from tipping or falling over.

To provide a safe operating motorcycle lift, a protective skirt delineates and defines the perimeter of operational area beneath the lift. The motorcycle lift has a newly designed locking mechanism that automatically engages when raised to prevent the accidental or inadvertent release, which may lower the lift.

The present invention includes an adjustable center kickstand support that has an adjustable side kickstand support that projects from the center stand support bracket. The bike lift also has a removable tail extension with a retractable tail ramp that enables the loading or removal of the bike.

Additionally, the safe operating motorcycle lift has a locking front wheel clamp that secures and stabilizes the 2-wheeled vehicle in an upright position.

BRIEF DESCRIPTION OF THE DRAWINGS

The present invention is pictorially illustrated in the accompanying drawings that are attached herein.

FIG. 9 is a top elevational view of the removable tail extension of the motorcycle lift stand, shown attached to the main frame member.

FIG. 10 is a fragmentary axonometric projection of the protective automatic locking means that provides for the safe operation of the present invention.

FIG. 11 is a fragmentary bottom elevational view of the protective automatic locking means that provides for the safe operation of the present invention.

FIG. 12 is a fragmentary side elevational view of the protective automatic locking means that provides for the safe operation of the present invention.

DETAILED DESCRIPTION OF THE INVENTION

Motorcycle enthusiasts generally prefer to service and maintain their own bikes instead of having a service repair agency perform their periodic maintenance. Often this is not possible because of the lack of equipment that is needed to perform these tasks. Service departments and repair facilities have devices for elevating the motorcycle to a height that is convenient for the repairman to work on the bike. These lifting devices are generally mounted in a fixed location and are not designed for portable use.

Presently available units that are designed for portable use are often lacking in safety features that can protect those persons coming in contact with it in a home environment, such as when being used in the motorcyclists garage. In a home environment, when the motorcycle is lifted to a height that is convenient for the repairer to work on the bike, there may be danger to one's children or pets, of having the motorcycle on top of the lift, tip and topple over, thereby injuring those nearby. Accidental lowering of the lift could crush a child or pet that could be playing beneath it. Storage of the apparatus, when not in use, can also create a problem because of it's size.

The present invention relates primarily to a newly designed motorcycle lift that has several safety measures embodied in its design, fabrication, use, and operation.

Figure 1:
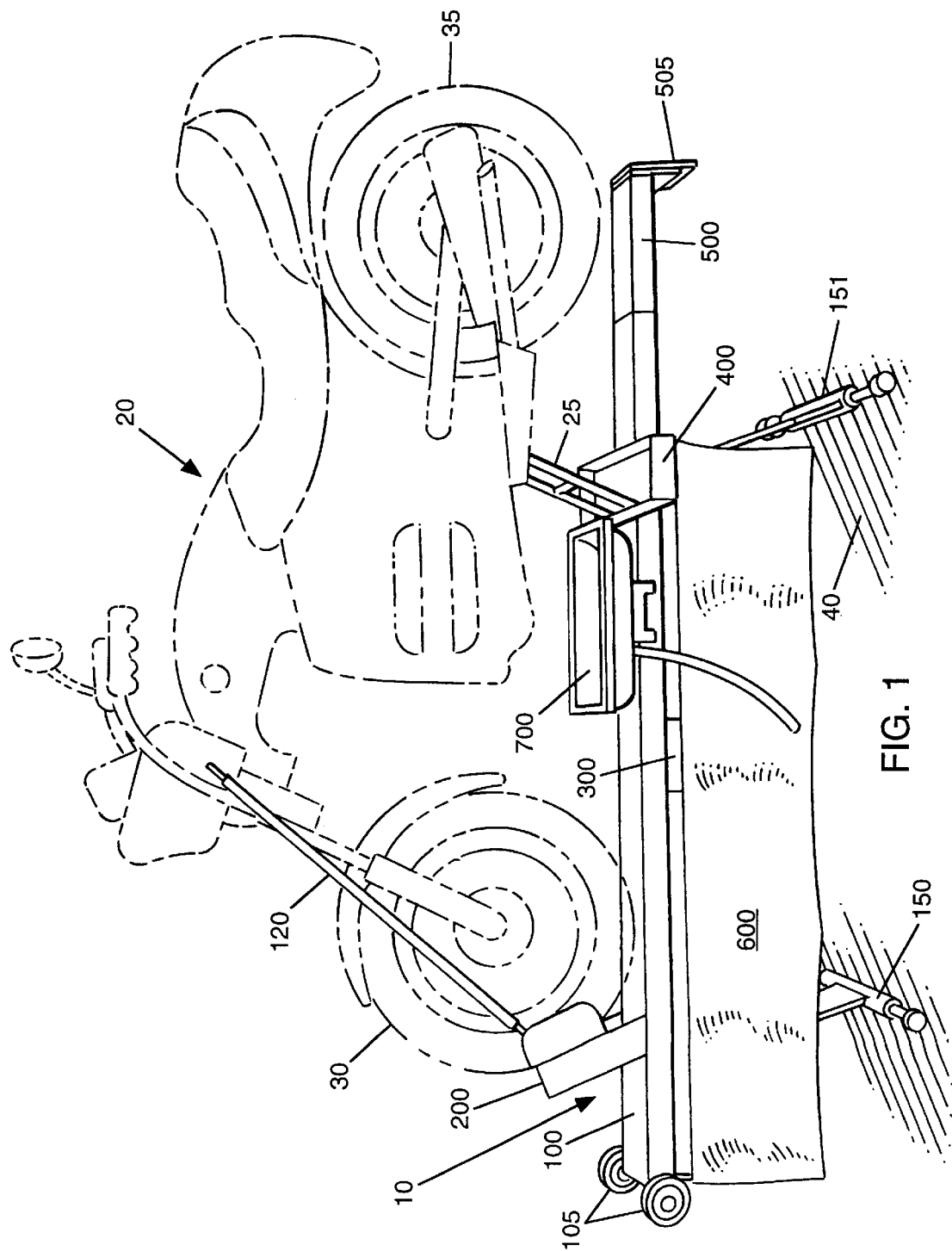
FIG. 1 is a side elevational view of the preferred embodiment of the motorcycle lift, in its elevated position, supporting a motorcycle, which is shown in phantom lines. The protective curtain that defines the hazardous working area is also shown in position.

As illustrated in FIG. 1, there is shown a motorcycle 20 being lifted above a stationary surface plane 40, by the lift apparatus 10 in accordance with the preferred embodiment of the present invention.

The present invention is sized to fit bikes having a wheel base up to 80 inches without the need of customizing the front wheel clamp 200 when used with longer bikes. Its hydraulic jack is operated manually, requiring no external supply of air or electricity. The present invention provides a purposeful combination of stability and versatility for the safe operation of the lift apparatus.

The lift apparatus of the preferred embodiment is designed to lift up to 1,000 lbs., and is designed to raise the bike twenty-one inches above the ground level for comfortable and easy access when working on the bike. The entire base area is approximately 1,450 square inches. Because the lift acts upon the entire distributed weight through the tires, the undercarriage, including the fairings and chrome are thereby protected. Additionally, the lift operates by lifting the bike via the bottom of the tires, where it does not interfere with the exhaust system.

This novel motorcycle lift stand 10 is comprised of a main frame 100, a front wheel tire clamp assembly 200, a center stand support 400, a removable tail extension 500, front and rear legs, 150 and 151, and curtain 600. The automatic locking mechanism 300 is centrally located approximately midway between the support legs 150 and 151, beneath the main frame 100. A typical motorcycle 20, having an adjustable center and side kickstand support 25, is shown positionally maintained in the tray recess of center stand support 400.

The oil collection tray 700 is particularly useful, especially when draining the oil from the engine and changing the oil filter. The oil drain pan 700, when mounted on the main frame, provides for convenient, no mess oil changes.

Ratcheting tie straps 120 hold the bike firmly when removing or pulling the motorcycle engine. These two straps fasten the handlebars of the motorcycle to the tie bar to ensure greater stability. When removing the engine from the bike, a rear wheel tie strap (not shown) is provided to fasten the rear wheel of the motorcycle to the body of the lift.

A removable tail extension 500, with a retractable tail ramp 505 finds application when changing tires or wheels. A retractable ramp 505 provides for the ease of loading the bike. It slides into the removable tail extension 500 that is attached to the main frame 100, to be out of the way after loading.

Figure 2:
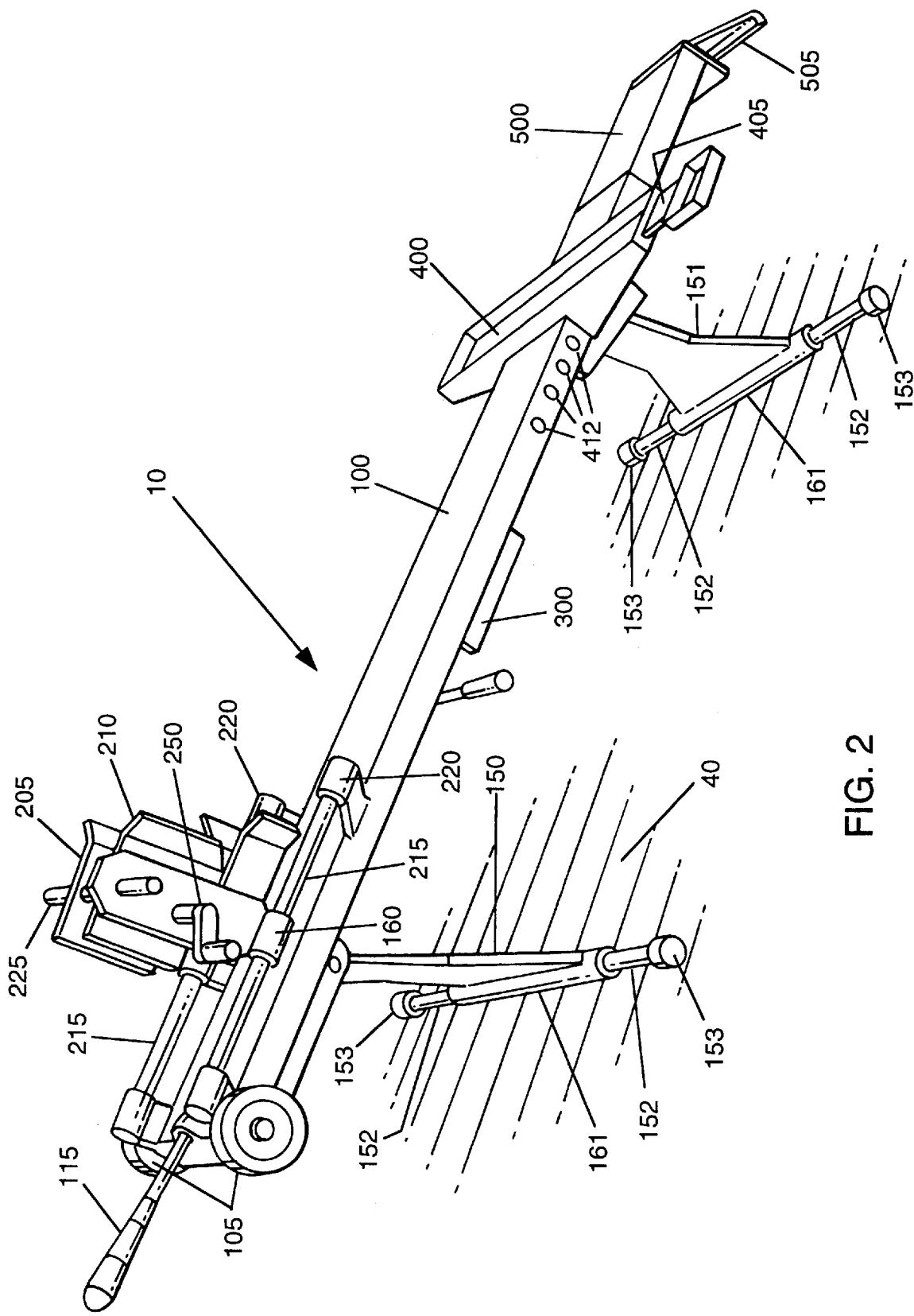
FIG. 2 is a perspective view of the preferred embodiment of the motorcycle lift, in its elevated position.

When repairing the front end of the motorcycle, such as performing a brake repair or tire replacement, the front wheel 30 of the bike 20 can be made to rotate freely by backing the motorcycle onto the lift. Subsequently, the rear wheel 35 is clamped to the main frame 100 in wheel clamps 205 and 210, (FIG. 2). After the bike is secured to the main frame, the tail extension 500 can be removed.

The set of wheels 105, which may be one or more rollers or wheels, aid in the mobility and maneuverability of the lift, particularly when storing the lift beneath ones truck or automobile. It's low profile and two front wheels 105 makes it easy to maneuver and store under a vehicle. For easy storage, the lift can be lowered to less than seven inches (7").

A protective curtain 600 is provided to delineate and define the perimeter of the operational area beneath the lift. The protective curtain is supported by two rods (not shown) and extending on both sides of the working area. The curtains must be removed before the lift is stored under ones car.

A safety automatic locking mechanism 300 is provided to secure safely the lift at a height of twenty-one inches (21"). When the locking mechanism is engaged, the pressure in the hydraulic pump is relieved, thereby adding to the safe operation of the lift. This locking latch mechanism must be released before the lift can be lowered.

Figure 3:
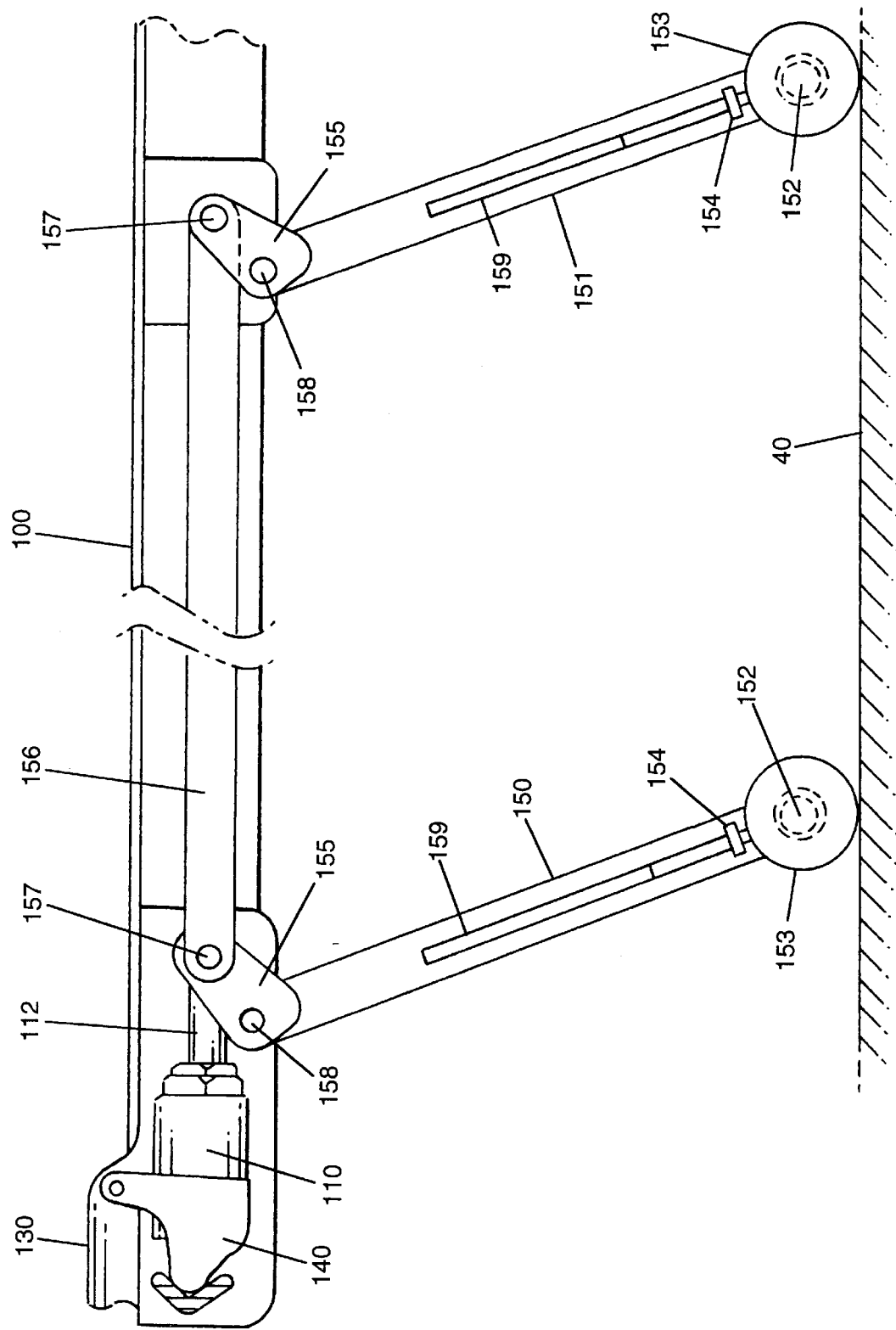
FIG. 3 is a side elevational view of the preferred embodiment of the motorcycle lift, in its partially elevated position.

Turning now to FIGS. 2, and 3, a more detailed perspective view of the preferred embodiment is shown for clarity, without the motorcycle mounted on the lift stand 10 and with the protective curtain 600 removed. The main frame 100 is a steel reinforced member that is designed to support the center stand 400 or side kickstands 405.

In the preferred embodiment of the present invention, the 2-wheeled lift mechanism 10 is comprised of the main frame 100, a hydraulic cylinder 110 mounted in pivoting pump cradle bracket 140, two trestle type steel legs 150 and 151, to which are attached four telescoping extendible rods 152, each having extendible rod feet 153. The extendible rods 152 are secured clamped in position by the knurled screws 154.

To each trestle styled leg 150,151 is welded a leg link 155 that pivots on leg pivot 158 supported in bearing 158a. Completing the novel open-based parallelogram configuration, is tie link 156 that is connected via tie link bearings 157.

The lift is raised to its working elevation by inserting the pump handle 115 into the pump handle sleeve 130, and pumping it up and down using a slow, even motion. This pumping action causes hydraulic pump rod or piston 112 to extend from the hydraulic cylinder 110, pushing the horizontal tie link rod 156 in a direction that is toward the end of the lift that receives the removable tail extension 500. At each end of the horizontal tie link rod 156, is a tie link bearing 157a on pivot 157. Pushing on tie link 156 in a forward direction causes the rotation of legs, 150 and 151, to elevate the lift slowly, while maintaining a level profile. As the lift is slowly elevated, the base 161 and feet 153 rotate almost ninety degrees, until the legs are upright in a vertical position. Due to the concurrent action on each of the legs, the lift has a level profile while being raised to, and at, the working elevation.

Figure 4:
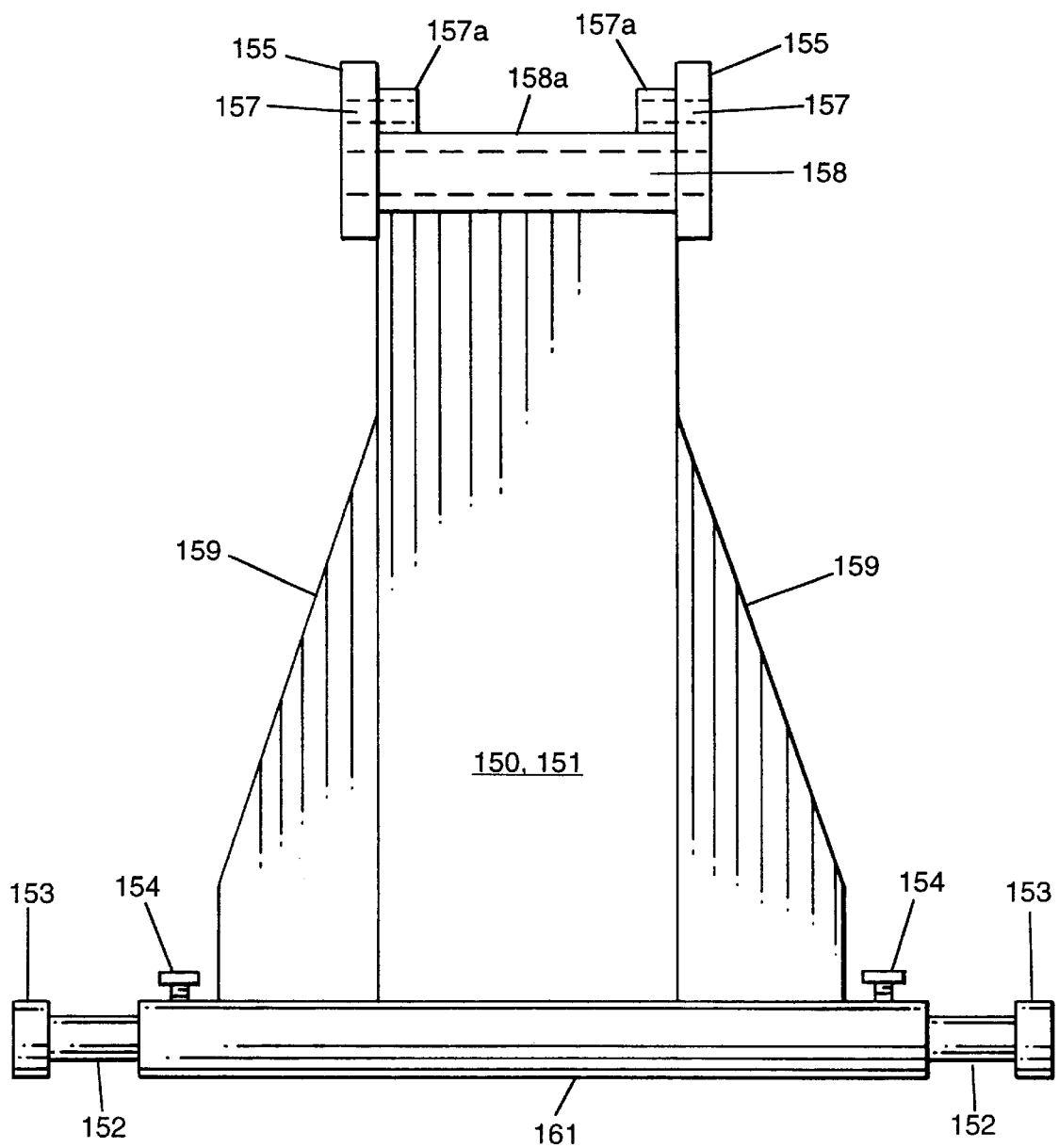
FIG. 4 is a front view of the lift stand, support member.

FIG. 4 details the configuration of the trestle styled legs 150 and 151. At the base of each leg is welded the cylindrical leg base 161, which receives the telescoping extendible rods 152. The diameter of the extendible rod feet 153 is preferably the same as the diameter of the cylindrical leg base 161, where the gross weight is principally carried upon the cylindrical leg base 161. Being of the same diameter, the extendible rod feet do not carry the principle load, but merely serve to stabilize the lift and to provide a means to prevent it from tipping over. The entire base area protected with the telescoping rod feet fully extended covers approximately 1,450 square inches.

Each leg is further strengthened with a pair of gusset plates 159, which stabilizes the lift system, thereby preventing it from rocking laterally. The diameter of the extendible feet 153 is of the same diameter of the cylindrically shaped base.

Figure 5:
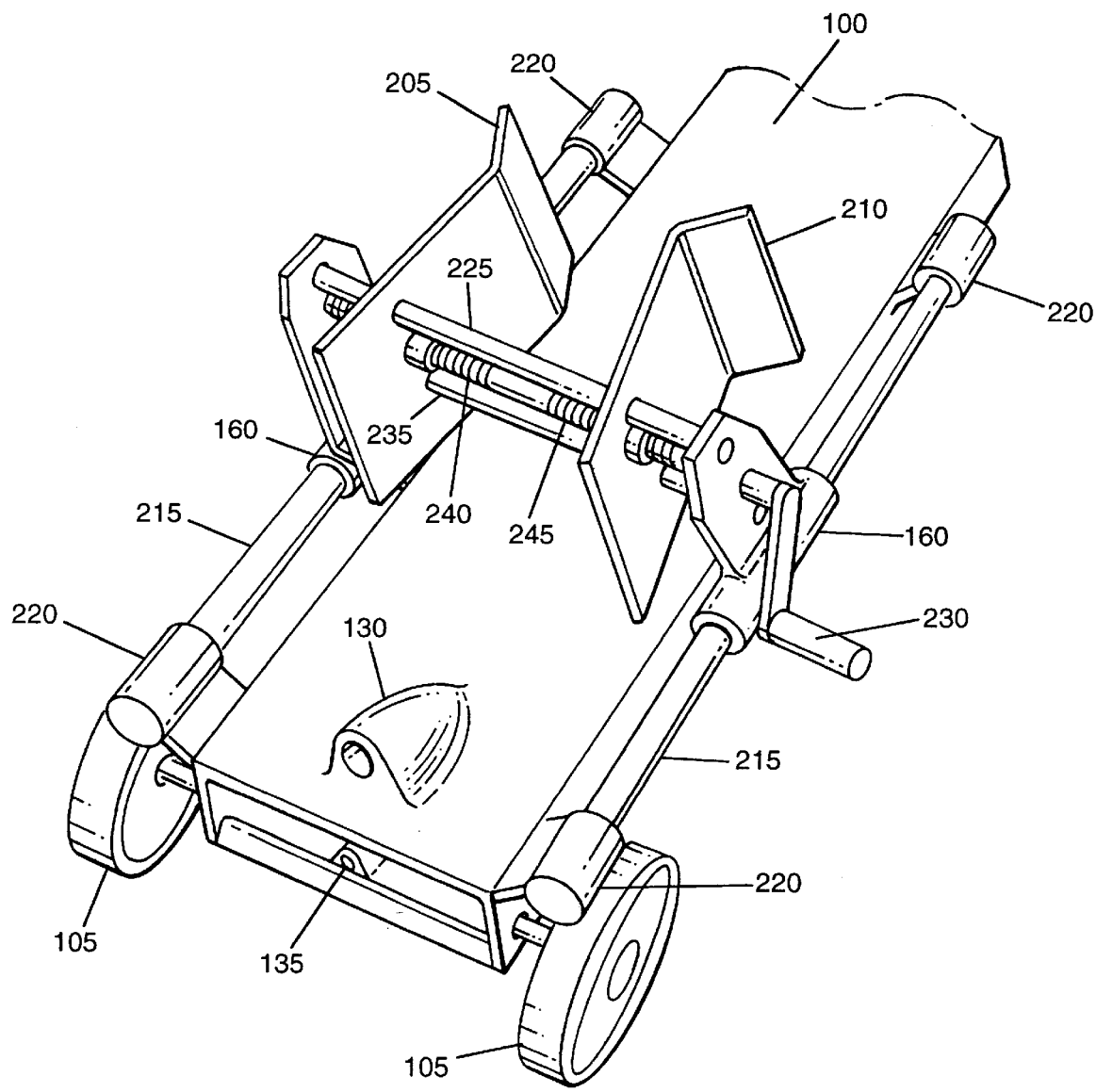
FIG. 5 is a fragmentary perspective view, shown from above, of the tire-clamping members of the preferred embodiment.

FIG. 5 is a detailed perspective view that shows the front wheel, tire clamp assembly 200.

The front wheel clamp assembly 200 is positioned by sliding freely on the longitudinal rails 215, to facilitate deployment of the center or kickstand and to fit the size and dimensions of the motorcycle 20 to be lifted. After the tire is securely retained in the wheel clamp, its position on the longitudinal rails is secured using the two knurled screws on the rails 215 after the center or kickstand is deployed. It is advantageous that the rear wheel 35 should rest in the center of the removable tail extension 500.

The front wheel clamps 205 and 210 move in from both sides simultaneously to center the front wheel 25 in the center of the lift. They are guided in their travel on upper transverse, clamp rod 225, and lower transverse clamp rod 235.

The clamps 205 and 210 open and close via the rotation of crank handle 230. Connected to the crank handle 230 is an axle having a left-hand threaded screw thread 245 (closest the crank arm) and a right-hand threaded screw thread 240 (furthest from the crank arm). Clockwise rotation of the crank handle 230 opens the front wheel clamps 205, 210, and conversely, counter-clockwise rotation closes the front wheel clamp assembly 200.

In typical use, the clamp handle 230 is turned to either open or close the clamp assembly 200, so that the distance between the clamps 205 and 210 is about ½ " wider than the bike's front tire size or width, when clamping or removing the tire from the clamp. After locating the tire in the clamp, the wheel is hand tightened securely into the clamp 200.

Having elongated toes on the shoes of the front wheel clamps 205 and 210 prevents the front wheel 30 from twisting or turning.

Figure 6:
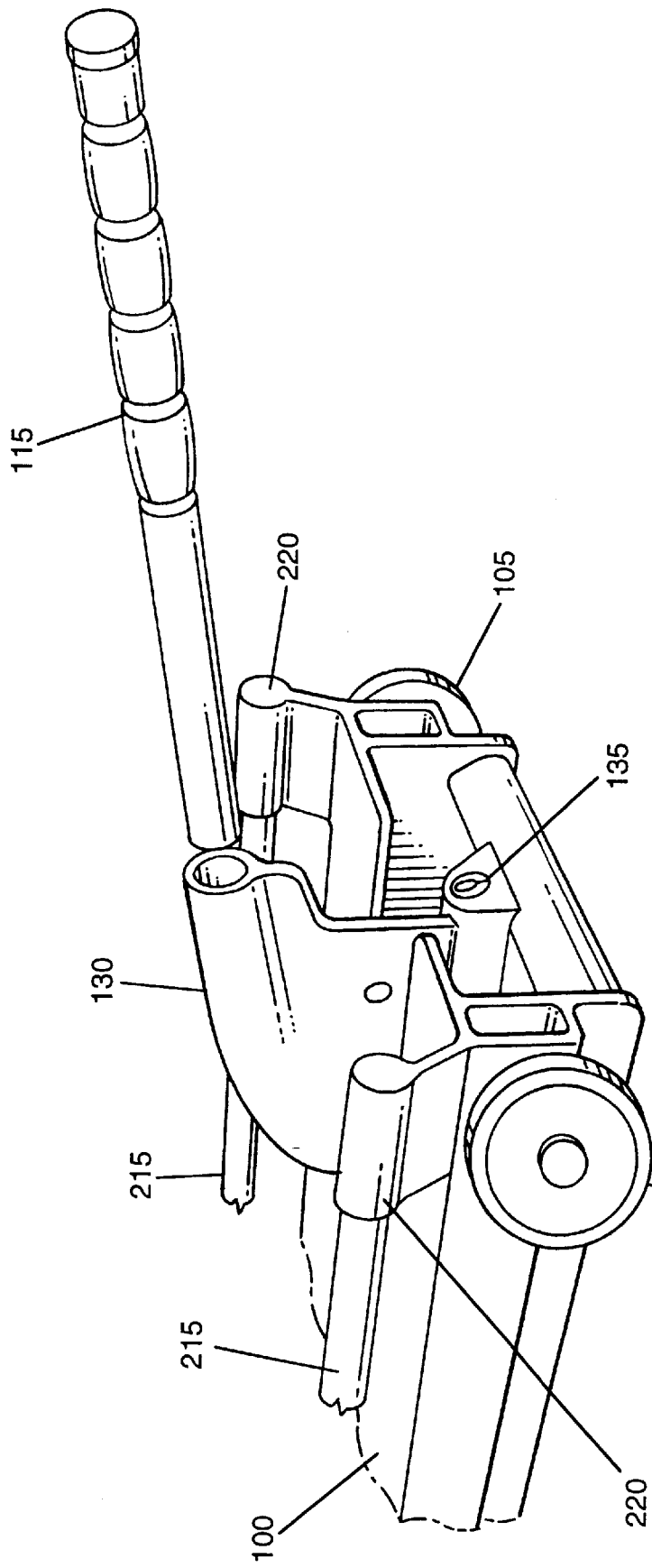
FIG. 6 is a fragmentary perspective view, shown from the side, detailing the manual hydraulic actuating means of the preferred embodiment.

FIG. 6 is an end perspective view showing the hydraulic operating means. To operate the hydraulic pump, use the slotted end of the handle 115 to rotate the release valve 135 fully clockwise until it is hand tight. This release valve is found under the main frame 100, just above the wheels 105. It has a round slotted valve to receive the lift control handle 115. There is a pin through one end of this handle, on the side opposite the handgrip, which fits into the slot of the flow control valve 135 on the hydraulic pump cylinder 110. To lift, place the handle 115 into the pump handle sleeve 130 and pump up and down using a slow, even motion. It is necessary to raise the unit completely (usually about 25 pumps) to engage the lift's lock. By repeatedly raising and lowering the jack handle 115, in a pumping action, the lift will rise, lifting the motorcycle to the desired working height of 21 inches.

Even if oil needs to be added to the pump when in use, hydraulic oil can be added having no detrimental effect. Even in case of a complete hydraulic failure, the unit can be hand-wrenched to lower it safely. Please note to release the lock latch before lowering.

Center Stand Support

Figure 7:
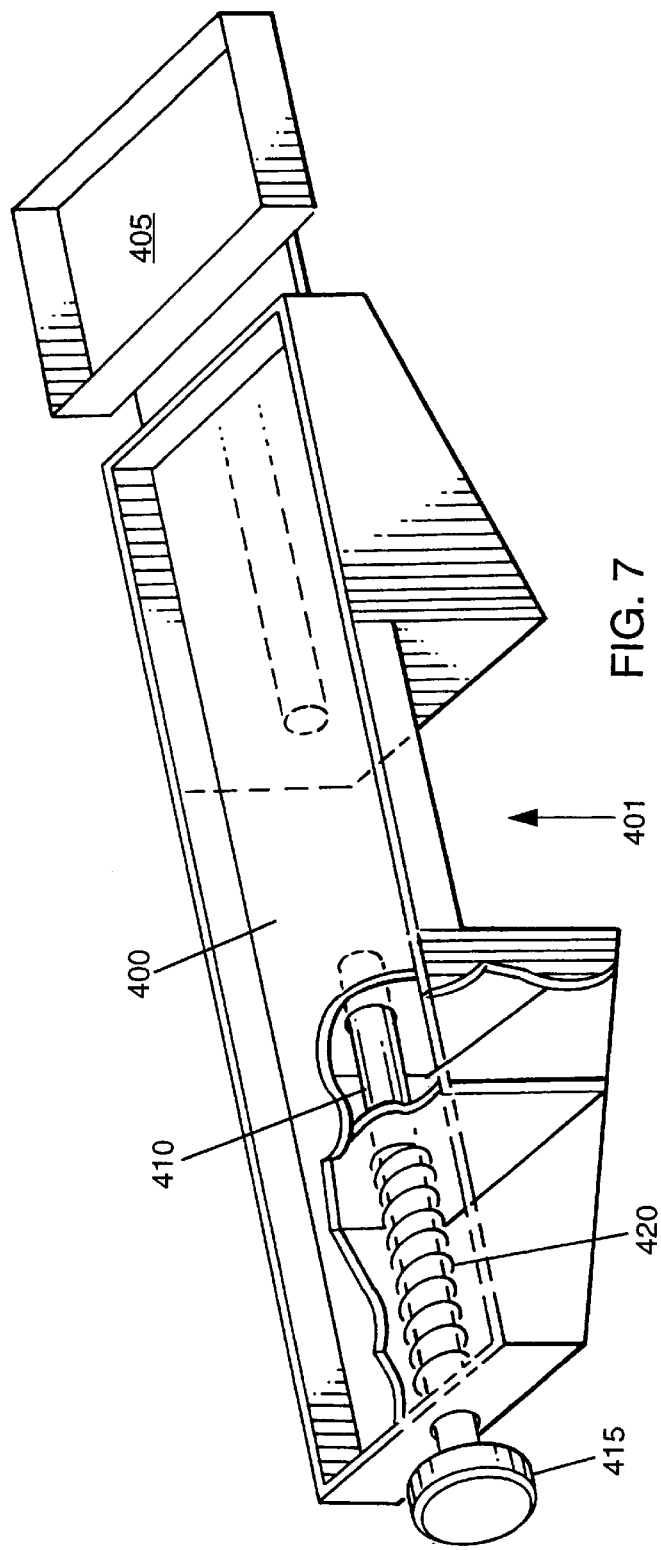
FIG. 7 is an axonometric projection of the versatile center kickstand and side kickstand, support member of the present invention.

The center stand support 400 and adjustable side kickstand support bracket 405 are best illustrated in FIG. 7, in addition to FIGS. 1 and 2.

The center support bracket 400 is installed on the main frame 100 by pulling out the lock-out lever 410 on each end of the center support 400 and by moving the lever on each end to be pointing inward, thereby locking the two locating pins in an "out position." This is done to each end of the center stand. The hydraulic flow valve 135 is then closed and the lift raised to full height until the engagement of the automatic locking mechanism 300 is heard. Place the support stand on the main frame and slide it into place from the back of the main channel 401. When the center stand 400 is in the correct position for the bike's center stand 25, release the spring-loaded locking pins 410 on each end; allow them to enter the holes 412 in the main frame channel to firmly lock the center stand in place as biased in place by pin compression springs 420.

The main frame 100 is reinforced to support either the center or side kickstands. The center stand is movable to locations that are suitable for the design of the bike being raised.

Side Kickstand Support Platform

If the bike is equipped with a side kickstand instead of a center stand, the side kickstand support 405 is easily slid into the end of the center stand support 400, where it may be pinned at the correct distance, ready to receive the kickstand from the bike. A side kickstand is normally found at the left side of the lift. The side kickstand platform 405 is typically about one inch higher than the center kickstand support. This side kickstand support 405 is adjustable to fit the kickstand design of most bikes; i.e., kickstands up to 18 inches in length from the center of the bike tire. A special kickstand platform, (not shown), is available to accommodate kickstands up to twenty-three (23) inches from the center of the bike tire, when working on a bikes equipped with extra-long kickstands.

Removable Tail Extension

Figure 8:
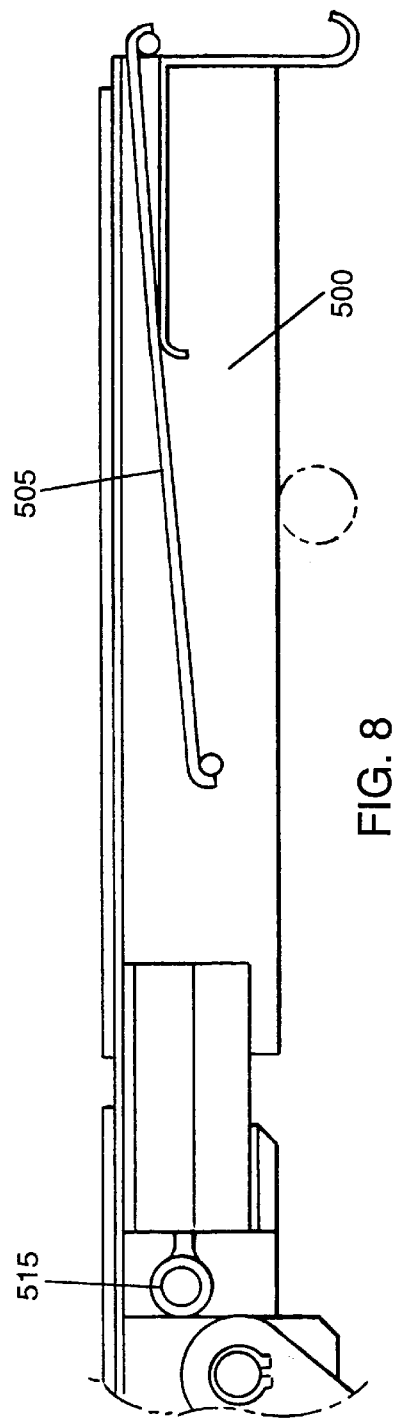
FIG. 8 is a side elevational view of the removable tail extension of the motorcycle lift stand, shown attached to the main frame member.

Turning now to FIGS. 8, and 9, there is shown the removable tail extension 500 and retractable ramp 505.

The removable tail extension 500 is installed by grasping it by handles 510 and sliding the tail extension onto the rear open end of the main frame channel 100. Align the tail extension so that both ends butt together tightly. The locking pin 515 must pass through both sidewalls of the main frame 100.

The rear ramp 505 is extended downwards by pulling it straight out from the end of tail extension 500. Once the bike is on the lift, the retractable ramp may be slid back into the tail extension for storage. The retractable ramp 505 is further useful when loading a bike onto a truck. It can be extended upward when the jack is raised to join the lowered tailgate of a truck for loading a bike onto the truck.

The removable tail extension 500 allows access to either tire for the cleaning or removal of the wheel. For access to the front tire, the bike should be backed onto the lift.

Lift Lock Mechanism

FIGS. 10, 11, and 12, show the safety lock mechanism 300 that automatically engages when the motorcycle lift is in the fully raised position. One must ensure that the lock mechanism is engaged after the bike is lifted. If necessary, the locking mechanism can be manually activated.

The locking mechanism 300 is comprised of a lock engagement arm 325, that is secured via pivot rod and bearing 320 to the tie link rod 156. The lock engagement arm 325 is held in the locked position by two extension springs 305*a* and 305*b* and lock engagement pin 330. The lock engagement arm pivots about the pivot rod and bearing 320. A pair of double nuts 315 locks the position of the threaded adjustment rod 335. The lock release lever 310 provides a safety release before the bike can be lowered and, as such, provides assurance that a motorcycle can be safely loaded on the lift and raised in a one-man operation without any additional or specialized tools.

Before lowering the lift, be sure to check under the lift stand to remove all tools, parts, pets, or children. They may have taken refuge under the lift and are concealed by the protective curtains.

The lift must be in the fully raised position before the lock can be released. To unlock, press downward on the lock release lever 310 located along the side of the unit. To relieve the force exerted on the lock release lever 310 and lock arm 325, raise the lift by giving one or two pumps on the lift control handle 115. Then, using the handle 115, turn the release valve slowly ⅛ of a turn or less and stay clear while the unit lowers. If the release valve is turned more than ⅛ turn, the motorcycle may lower much too quickly.

Protective Curtains

The protective curtains 600, as illustrated in FIG. 1, are provided to isolate the area directly beneath the lift mechanism. The weight of the lift and the added weight of the motorcycle can exceed 1,000 pounds, which can cause serious injury when lowered. The boundary surrounding the perimeter of the lift serves as a reminder that one's feet or others should not intrude the area under the lift. These curtains not only provide for a neat appearance, for aesthetic purposes, but also, primarily serve to reserve a safe area of operation beneath the frame of the unit. When lowered, the frame of the unit rests on top of the four feet of the lift that are one inch or more from the flat surface that underlies the lift mechanism.

The curtains also help to prevent tools or parts from the bike from hiding under the lift, and possibly becoming damaged or broken by the weight of the lift when lowered. However, the curtains also provide a good hiding place for pets or even children, and the area beneath the lift should be checked carefully before lowering the lift.

The protective curtains are provided with four (4) rods. Two of the rods are threaded through the hems of the curtain, and the lighter top rod is placed on the hooks welded to the lift to support the curtains. The heavier rod is to be placed on the bottom, which follows the special design of the angled framework supporting the legs to indicate the outline of the lift frame when lowered. One curtain has an opening to gain access to the lowering release lever 310, where the curtain on the opposite side has no access opening.

Side curtains are a reminder for safe location of one's feet or other people's feet. Also, the side curtains aid in preventing tools and parts from disappearing under the lift.

A Safe Operating Procedure

7. The motorcycle lift now is in a state of readiness, to receive the motorcycle being guided up the ramp. Slowly roll the motorcycle up the ramp and along the length of the motorcycle lift, fully forward, then placing the front tire 30 firmly into the wheel clamp 200. Then tighten the wheel clamp to grip the front tire very firmly. The two (2) safety tie straps 120 must also be used to secure tightly the tie strap, to the tie bar eyes and handlebars; then ratchet to a snug fit. Place a third small strap around the rear wheel and the main frame or tail extension to keep the bike aligned on the center of the lift.

8. To lift: Turn the release valve 135 fully clockwise until it is hand tight, using handle 115. This release valve is found under the main frame 100, just above the wheels 105. It has a round slotted valve actuator to receive the lift control handle 115. There is a pin through one end of this handle, on the end opposite the handgrip, which fits into the slot of the flow control valve 135 on the hydraulic pump cylinder 110. To lift, place the handle 115 into the handle sleeve 130 and pump up and down using a slow, even motion. It is necessary to raise the unit completely (usually about 25 pumps) to engage the lift's lock. By repeatedly raising and lowering the jack handle, in a pumping action, the lift will rise, lifting the motorcycle to the desired working height of 21 inches.

9. When in the fully upright position, the locking mechanism 300 will engage, thereby sustaining the elevated position, commensurate with relieving the hydraulic pressure in the cylinder 110. If for any reason the locking mechanism does not engage, move the lick handle manually into the locked position.

10. The protective curtains 600 should now be installed to define the working area beneath the motorcycle lift and motorcycle.

11. Store the retractable tail ramp 505 into the recess of the removable tail extension 500.

12. To Lower: Inspect beneath the lift to ensure that there are no concealed tools or parts that could be damaged, or children or pets that could be injured. Keep one's feet out of the protected pinch area at all times, especially when lowering the unit.

The safety lift lock must first be disengaged. To unlock, press downward on the lock release lever 310 located along the side of the unit. The lift must be in the fully raised position before the lock can be released. To relieve the force exerted on the lock release lever 310 and lock arm 325, raise the lift by giving one or two pumps on the lift control handle 115. Then, using the lift control handle 115, turn the release valve counter-clockwise slowly ⅛ of a turn or less and stay clear while the unit lowers. If the release valve is turned more than ⅛ turn, the motorcycle may lower much too quickly. It is important that it is lowered slowly to prevent injury to yourself and others or damage to property.

Storage

The height of the unit when fully lowered, with the wheel clamps and center kickstand removed, is less than seven inches. It can easily be stored under most cars by removing the front wheel tire clamp 200 and center kickstand 400, but some caution must be observed. If the lift is going to be stored under one's car, it is important not to cover the unit with any type of combustible material, as this can create a fire hazard. For example, the catalytic converter in one's automobile becomes very hot after the engine has been running for a while. When the engine is turned off, heat from the converter is retained for quite some time. Should any combustible material come near the catalytic converter when it is hot, it can result in a fire. If one wishes to store the lift under one's car and cover it, the lift should be covered either with a noncombustible material or with a sheet metal housing.

The unit can be stored vertically in a corner of a room by standing it on its front-end nose. To prevent it from sliding or falling, which could result in damage to the equipment or injury to children, it can be chained or strapped in a corner of the storage area.

Additional Safety Constraints

The capacity of the present invention is limited to 1,000 pounds maximum. The unit is designed to lift one 2-wheeled motorcycle at a time. This includes the combined weight of the motorcycle and accessories. Never lift a person or persons that are seated upon the motorcycle. Keep children away from the unit. It is not a toy. It is not intended to be used for any other purpose. Serious harm may result to persons or objects upon misuse or abuse to the unit. Keep one's hands, fingers, feet, and the like, away from all moving parts within the range bounded by the protective curtains, to prevent pinching or loss of body parts.

It should be understood that there may be numerous modifications, advances or changes that can be made to the present invention, but in doing so, it is intended that they should not detract from the true spirit of the present invention.

I claim:

1. A portable motorcycle lift, comprising:
    a lift frame to support and raise an upright motorcycle to a working elevation by a lifting action on its tires, thereby protecting a motorcycle undercarriage, fairings and chrome;
    a pair of rotatable legs, each leg pivotally connected to the frame, the lift having an open-based parallelogram configuration at the working elevation;
    means for raising the motorcycle with a level profile while being raised to, and at, the working elevation, said means for raising mounted on the frame and articulating with each leg of the pair;
    means for automatically locking the lift frame at the working elevation; and,
    means for securing the motorcycle in a centered, stable, upright position, the means for securing comprising a wheel clamp assembly on the lift frame for securing a motorcycle wheel; and, an at least one ratcheting tie strap extending between said clamp assembly and the motorcycle for bracing the motorcycle on the frame.

2. The portable motorcycle lift according to claim 1, further comprising,
    means for stabilizing the lift frame associated with each of said legs.

3. The portable motorcycle lift according to claim 2, the lift frame further comprising a center stand support having pins for insertion in corresponding holes through sides of the lift frame, for locating said center stand support in a suitable position for the motorcycle being raised.

4. The portable motorcycle lift of claim 3, further comprising a side kickstand support that slidably inserts into said center stand support, where it is pinned at a correct distance to receive a motorcycle side kickstand.

5. The portable motorcycle lift according to claim 4, the means for raising comprising a pump cradle bracket that retains a hydraulic cylinder with a pump rod, the pump cradle bracket and cylinder rotatably mounted on the lift frame, a pump sleeve associated with said cylinder and a pump handle insertable in the sleeve; the pump rod pivotally connected to a tie link rod that articulates with each leg via a pair of leg links fixed to each leg that is pivotally connected to the lift frame, whereby pumping action on the handle and sleeve pushes said pump rod and the tie link rod concurrently driving of each leg in a parallel pivot motion to elevate the frame.

6. The portable motorcycle lift according to claim 5, further comprising a means for longitudinal positioning of said means for securing to accommodate the size and dimensions of the motorcycle being lifted.

7. The portable motorcycle lift according to claim 6, wherein the means for stabilizing comprises each trestle leg having a leg base with two laterally extensible rods with a telescoping foot extending radially outward from the stand to broaden each base and stabilize the lift stand;
    further comprising a pair of knurled screws mounted in each leg base, whereby the extensible rods are clamped in position by the knurled screws; and,
    a pair of gusset plates positioned laterally on each leg and extending radially down from each leg for a buttressing interconnection between each leg and the leg base, thereby preventing the lift stand from rocking laterally.

8. The portable motorcycle lift according to claim 7, wherein each of the feet is essentially circular with a diameter.

9. The portable motorcycle lift according to claim 8, wherein the leg base is essentially cylindrical with a diameter.

10. The portable motorcycle lift according to claim 9, wherein the diameter of the leg base is essentially equal to the diameter of said feet.

11. The portable motorcycle lift according to claim 10, wherein a gross weight of the lift stand with a motorcycle load is principally sustained by the base and the extendible telescoping rod feet serve to prevent the lift frame from tipping over.

12. The portable motorcycle lift according to claim 11, further comprising a tail section removably attached to the lift frame, including a retractable tail ramp, to facilitate loading a motorcycle onto the lift.

13. The portable motorcycle lift according to claim 12, further comprising, an at least one wheel rotatably connected to the lift frame to facilitate mobility and maneuverability of the lift.

14. The portable motorcycle lift of claim 13, further comprising, an at least one protective curtain suspended from the lift frame at the working elevation to delineate an operational perimeter beneath the lift.

15. The portable motorcycle lift of claim 14, the lift frame including a fully lowered condition with a low profile height, wherein the wheel clamp assembly and center stand are removed, said height being less than seven inches to facilitate storage of the lift.

16. A motorcycle lift, comprising:

a main frame to support and raise a motorcycle to a working level, the frame having an at least one wheel installed at an end thereof for portability of the lift;

a pair of rotatable legs pivotally connected to the main frame and a pivoting hydraulic drive means including a tie link rod, associated with said frame and articulating with each leg for simultaneously driving each leg of the pair to raise the frame;

further comprising a wheel clamp assembly with a pair of longitudinal rails, each rail, mounted on an opposite side of said main frame, having an associated rail lock and a lateral wheel clamp shoe with an elongated toe; each lateral shoe opposed to the other and mounted on a threaded axle including a crank handle at an end thereof; and, wherein the thread direction for each shoe is oppositely disposed for opening the wheel clamp assembly by a first rotation of the handle and closing the clamp assembly by second rotation opposite the first rotation, for clamping a motorcycle wheel and securing a motorcycle to be raised in a centered position on the main frame;

further comprising an automatic lift lock mechanism comprising a lock engagement arm having locking notch and a release lever, the engagement arm rotatably secured to said tie link rod via a pivot rod and bearing and including a pair of extension springs to retain said arm in a lock position; a lock pin fixed at an adjusted longitudinal position to said main frame, whereby the locking notch receives the lock pin when the lift is raised to a working level to automatically immobilize the tie link rod and lock the lift in its raised position; and, thereby a motorcycle can be safely loaded on the lift and raised in a one-man operation without any additional or specialized tools.

* * * * *